United States Patent Office 3,507,885
Patented Apr. 21, 1970

3,507,885
3-ALKYL-6H-DIBENZO[b,d]PYRANS
Kenneth Earl Fahrenholtz, Bloomfield, N.J., assignor to Hoffmann-La Roche Inc., Nutley, N.J., a corporation of New Jersey
No Drawing. Filed Mar. 25, 1966, Ser. No. 537,298
Int. Cl. C07d 7/20
U.S. Cl. 260—345.3          29 Claims

ABSTRACT OF THE DISCLOSURE

A process of preparing pyschotropic and analgesic 3-alkyl - 9 - hydrocarbyl(idine) - 6H - dibenzo[b,d]pyrans and novel intermediates therein.

---

This invention is concerned with 3-alkyl-6H-dibenzo[b,d]pyrans and to methods for their synthesis. More particularly, this invention is concerned with the synthesis of certain 3 - alkyl - 9 - hydrocarbyl(idene) - 6H - dibenzo[b,d]pyrans and to novel intermediates therefor.

The 3 - alkyl - 9 - hydrocarbyl(idene) - 6H - dibenzo[b,d]pyrans which may be produced in accordance with this invention are those represented by the formula:

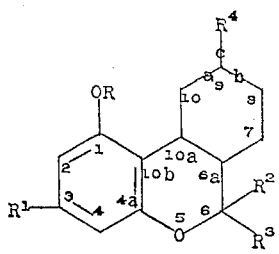

(I)

wherein R is hydrogen, lower alkyl, or lower acyl; $R^1$ is alkyl of from 1 to 10 carbons; $R^2$ and $R^3$ each are hydrogen or lower alkyl; $R^4$ is a lower acyclic hydrocarbyl or hydrocarbylidene radical free from aromatic unsaturation; and one of $a$, $b$, or $c$ represents a double bond with the other two each representing a single bond.

Subgeneric to these compounds are the 3-alkyl-9-hydrocarbyl - 6a,7,8,10a - tetrahydro - 6H - dibenzo[b,d]pyran-1-ols and their esters and esters of the formula:

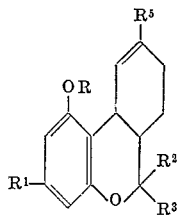

(Ia)

wherein R, $R^1$, $R^2$, and $R^3$ are as defined above and $R^5$ is lower acyclic hydrocarbyl free from aromatic unsaturation;

the 3 - alkyl - 9 - hydrocarbyl - 6a,7,10,10a - tetrahydro-6H-dibenzo[b,d]pyran-1-ols, their ethers and their esters of the formula:

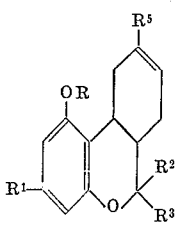

(Ib)

wherein R, $R^1$, $R^2$, $R^3$, and $R^5$ are as defined above; and the 3 - alkyl - 9 - hydrocarbylidene - 6a,7,8,9,10,10a - hexahydro-6H-dibenzo[b,d]pyran-1-ols, their ethers and their esters of the formula:

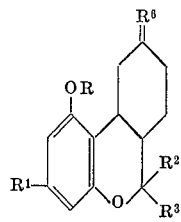

(Ic)

wherein R, $R^1$, $R^2$, and $R^3$ are as defined above, and $R^6$ is lower acyclic hydrocarbylidene free from aromatic unsaturation.

As used in this application, the term "hydrocarbyl radical" refers to a monovalent radical consisting of carbon and hydrogen only, which may be saturated such as alkyl, or unsaturated such as alkenyl or alkynyl, and may be either straight or branched chain. The term "hydrocarbylidene radical" has reference to a divalent radical consisting of carbon and hydrogen only and having both valence bonds from the same carbon atom. The term "acyl radical" refers to the residue of a hydrocarbyl carboxylic acid formed by removal of the hydroxyl of the carboxyl group. The term "lower," as applied to any radical, embraces radicals containing up to about 8 carbon atoms.

The novel compounds of this invention are those represented by the formula:

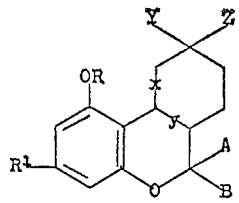

(II)

wherein R and $R^1$ are as defined above; Y, when taken alone, is a lower hydrocarbyl radical free from aromatic unsaturation; Z, when taken alone, is hydroxyl or chloro; and Y and Z, when taken together, are oxo or ketalized oxo, such as lower alkylenedioxy or di(lower alkoxy); A, when taken alone, is hydrogen or alkyl; B, when taken alone, is hydrogen or alkyl; A and B, when taken together, are oxo; $x$ represents a single or a double bond, but is not a double bond unless Y and Z are oxo; $y$ represents a single or double bond, which is double only when A and B and Y and Z, each pair when taken together, are oxo, and is single when A and B are other than oxo, only one of said $x$ and $y$ being single.

A preferred class of intermediates of this invention comprises the 3 - alkyl - 1 - hydroxy - 6a,7,10,10a - tetrahydro-6H-dibenzo[b,d]pyran-9(8H)-ones, their ethers and esters of the formula:

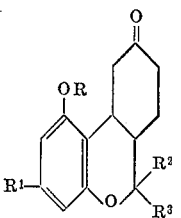

(III)

wherein R, $R^1$, $R^2$, and $R^3$ are as defined above.
Illustrative of these compounds are 3-methyl-1-hydroxy-6a,7,10,10a-tetrahydrodibenzo[b,d]pyran-9(8H)-one,
3-pentyl-1-hydroxy-6a,7,10,10a-tetrahydrodibenzo[b,d]pyran-9(8H)-one, 3-decyl-1-hydroxy-6a,7,10,10a-tetrahydrodibenzo[b,d]
  pyran-9(8H)-one,
3,6-dimethyl-1-hydroxy-6a,7,10,10a-tetrahydrodibenzo-
  [b,d]-pyran-9(8H)-one,
3-pentyl-6-methyl-1-hydroxy-6a,7,10,10a-tetrahydro-
  dibenzo[b,d]pyran-9(8H)-one,
3-pentyl-6-ethyl-1-hydroxy-6a,7,10,10a-tetrahydrodi-
  benzo[b,d]pyran-9(8H)-one,
3,6,6-trimethyl-1-hydroxy-6a,7,10,10a-tetrahydrodibenzo-
  [b,d]pyran-9(8H)-one,
3-pentyl-6,6-dimethyl-1-hydroxy-6a,7,10,10a-tetrahydro-
  dibenzo[b,d]pyran-9(8H)-one,
3-pentyl-6-ethyl-6-methyl-1-hydroxy-6a,7,10,10a-tetra-
  hydrodibenzo[b,d]pyran-9(8H)-one,
3-pentyl-1-methoxy-6,6-dimethyl-6a,7,10,10a-tetrahydro-
  dibenzo[b,d]pyran-9(8H)-one,
3-pentyl-1-acetoxy-6,6-dimethyl-6a,7,10,10a-tetrahydro-
  dibenzo[b,d]pyran-9(8H)-one, and the like.

The products of Formula I above are produced from a 5-alkyl-resorcinol in accordance with the following general reaction scheme:

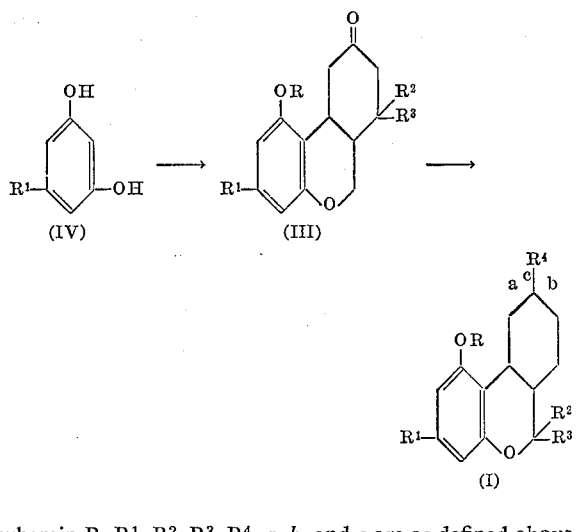

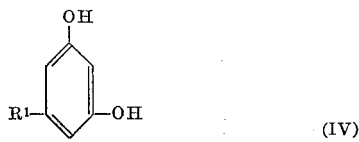

wherein R, $R^1$, $R^2$, $R^3$, $R^4$, $a$, $b$, and $c$ are as defined above.

The starting 5-alkylresorcinols are represented by the following formula:

(IV)

wherein $R^1$ is as defined above.

Illustrative examples of suitable 5-alkylresorcinols include 5-methylresorcinol,
5-ethylresorcinol,
5-n-propylresorcinol,
5-n-butylresorcinol,
5-n-pentylresorcinol,
5-(1-methylbutyl)resorcinol,
5-n-hexylresorcinol,
5-(1-ethylbutyl)resorcinol,
5-(1-methylpentyl)resorcinol,
5-(1,1-dimethylbutyl)resorcinol,
5-(1,2-dimethylbutyl)resorcinol,
5-n-heptylresorcinol,
5-(1-methylhexyl)resorcinol,
5-n-octylresorcinol,
5-(1-n-propylpentyl)resorcinol,
5-(1,2-dimethylheptyl)resorcinol,
5-(1-methyloctyl)resorcinol, and the like.

The compounds of Formula III wherein $R^2$ and $R^3$ are the same may be produced from the 5-alkylresorcinols via the following reaction scheme:

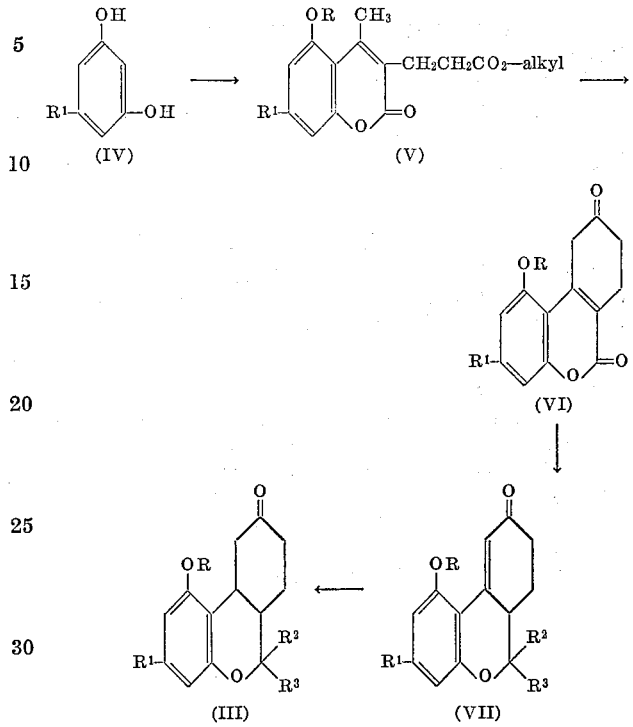

wherein R, $R^1$, $R^2$, and $R^3$ are as defined above. In accordance with this scheme, a 5-alkylresorcinol (IV) is reacted with a dialkyl α-acetoglutarate to produce a 4-methyl - 5 - hydroxy-7-alkylcoumarin-3-propionate (V). Compound (V) is then cyclized to a 1-hydroxy-3-alkyl-7,10-dihydro-6H-dibenzo[b,d]pyran-6,9(8H)-dione (VI), which, in turn, is converted to a 1-hydroxy-3-alkyl-6a,7-dihydro-6H-dibenzo[b,d]pyran-9(8H)-one (VII). Compound (VII) is then reduced to form compound (III).

The alkylcoumarin-3-propionate of Formula V is produced by the condensation of the 5-alkylresorcinol (IV) with a dialkyl α-acetoglutarate in the presence of a condensing agent in accordance with the known von Pechmann reaction. Suitable condensing agents includes Lewis acids such as sulfuric acid, phosphorus pentoxide, phosphorus oxychloride, phosphoric acid, zinc chloride, aluminum chloride, ferric chloride, stannic chloride, titanic chloride, boric anhydride, and the like, as well as bases such as sodium acetate, sodium methoxide, and the like. The remaining reaction conditions are not critical. Thus, the reaction temperatures may range from about 0° C. or lower to about 100° C. or higher. Although not necessary, the reaction may be conducted in any suitable inert liquid reaction medium, including hydrocarbons, such as benzene, toluene, xylene, kerosene, hexane, cyclohexane; chlorinated hydrocarbons, such as chloroform, carbon tetrachloride, chlorobenzene, and the like; ethers, such as diethyl ether, tetrahydrofuran, dioxane, and the like; etc. The product of this reaction, although normally the alkyl propionate ester, may sometimes be recovered, at least in part, as the free acid. In such case, it is necessary to esterify this acid prior to effecting the cyclization as discussed below.

Additionally, the 5-hydroxy-4-alkylcoumarinpropionate may be converted to its 5-lower alkyl ether or 5-lower acyloxy ester as desired. This conversion is effected in known manner. In general, these aromatic ether and ester moieties may be retained throughout the remaining steps of the reaction sequences disclosed herein. Accordingly, although specific reference will be made to the free phenolic compounds, it is understood that the corresponding esters and ethers are also intended unless otherwise stated.

The second step of the foregoing sequence to the intermediates of Formula III comprises a base-catalyzed cyclization of ester (V) to form the tricyclic lactone (VI). As a catalyst, one can employ a strong base such as an alkali metal lower alkoxide or an alkali metal hydride, for example, potassium tert.-butoxide or sodium hydride. This cyclization is effected in, as a reaction medium, a dipolar aprotic solvent, such as dimethylsulfoxide, dimethylformamide, and dimethylacetamide. Protic solvents such as ethanol, or non-polar solvents such as benzene are not suitable. The reaction temperature is not critical, but temperatures of from about 0–100° C. are generally employed, with temperatures of from about 0° C. to about 25° C. being preferred.

The third step of the above-outlined sequence comprises conversion of the lactone (VI) to tricyclic ether (VII). This conversion is effected by one of two routes, depending upon the desired product, i.e., whether $R^2$ and $R^3$ of ether (VII) are both hydrogen or are both alkyl.

6,6-dihydro compounds (wherein $R^2$ and $R^3$ are both hydrogen) are produced by treating a 9-ketal of lactone (VI) with an alkali metal-group III metal hydride (such as sodium borohydride or lithium aluminum hydride), boron trifluoride, and an ether, such as diglyme or tetrahydrofuran, thereby reducing the lactone (VI) to the corresponding ether.

In this step, as in many of the reactions to be discussed below, it may be necessary to protect the 9-carbonyl group. For example, in chemical reductions of this type or in catalytic hydrogenations, the carbonyl group in the 9-position may be reduced to a methylene group. In addition, in Grignard reactions the carbonyl group will react with the Grignard reagent, forming a 9-alkyl-9-hydroxy group. To avoid the loss of the 9-carbonyl group, the compound is converted to a 9,9-di(lower alkoxy) or 9-lower alkylenedioxy ketal by the known acid-catalyzed reaction of a ketone with a lower alkanol, such as methanol or ethanol, or a lower alkanediol, such as ethylene glycol. Accordingly, although reference may be made to 9-keto compounds undergoing certain reactions without loss of the 9-carbonyl group, it its understood that this reference is to these compounds in the form of their ketals. The 9-ketone is regenerated in known manner by hydrolysis.

The 6,6-dialkyl compounds of Formula VII are readily produced from the lactones of Formula VI via a Grignard reaction. Thus, the 9-ketal of the lactone of Formula VI is reacted with a lower alkyl magnesium halide or a lower alkyl lithium compound to replace the 6-keto group with two alkyl groups. The reaction temperature is not narrowly critical, and can be from about room temperature or below to about reflux temperature. Although unnecessary, it is desirable from the standpoint of economy to employ the 1-lower alkyl ethers in this and subsequently described Grignard reactions, for the free phenol or its ester reacts with the Grignard reagent, thus consuming the expensive Grignard reagent.

The intermediates of Formula III are readily produced from the compounds of Formula VII by reduction, for example, by treatment with an alkali metal reducing agent such as lithium, sodium, or potassium in a liquid ammonia or amine medium. A preferred reducing system comprises lithium in liquid ammonia. The reaction temperature is not narrowly critical, although temperatures of about −100° C. to about 0° C. are preferred. The product of this reduction is a mixture of 6a,10a-cis- and trans-isomers, with the trans-isomer predominating. These two isomers are readily separated by mixing the reduction product with aqueous alcohol, especially aqueous ethanol. The trans-isomer readily crystallizes from such an aqueous alcohol system, whereas the cis-isomer remains in solution.

As an alternative method, the 6,6-dialkyl-6a,10a-cis-isomer of Formula III may be produced in good purity from lactone (VI) by a two-step procedure comprising first a catalytic hydrogenation of a 9-ketal of lactone (VI), followed by reaction of the hydrogenated product with a Grignard reagent. The hydrogenation may be conducted in the presence of any suitable catalyst, such as Raney nickel, and the like. The reaction conditions are not critical, but are normally in the range of from about 25 to about 200° C. and from about 100 to about 5000 p.s.i. hydrogen. The resulting product is substantially entirely a 6a,10a-cis-compound of Formula VII. This compound is then reacted with the Grignard reagent in a manner similar to that described above, thereby producing 6,6-dialkyl-6a,10a-cis (III).

In still another sequence the compounds of Formula VII may be produced from the 5-alkylresorcinols of Formula IV by the following scheme:

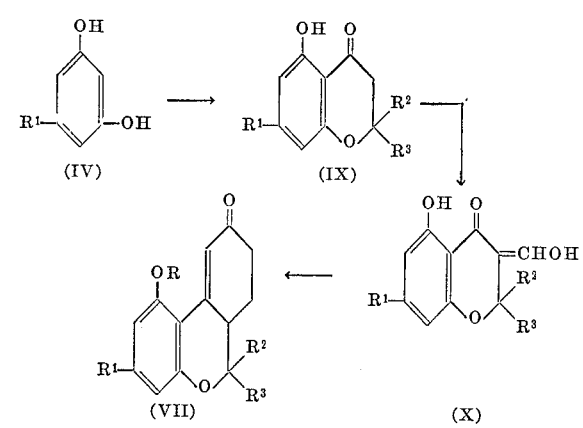

This procedure comprises (1) reacting 5-alkylresorcinol (IV) with an α,β-unsaturated acid or ester to produce a 5-hydroxy-7-alkyl-4-chromanone; (2) reacting the 5-hydroxy-7-alkyl-4-chromanone (IX) with an alkyl formate to produce a 3-hydroxymethylene chromanone (X); and (3) reacting the 3-hydroxymethylenechromanone (X) with methyl vinyl ketone in the presence of a base to form the compound of Formula VII.

The α,β-unsaturated acids or esters employed in the first step of this sequence are those represented by the formula:

$$R^2R^3C=CH_2CO_2R^7 \qquad (VIII)$$

wherein $R^2$ and $R^3$ are as defined above and $R^7$ is hydrogen or lower alkyl.

Suitable compounds include acrylic acid, crotonic acid, senecioic acid (3-methylcrotonic acid), hydrosorbic acid, methyl acrylate, ethyl acrylate, and the like.

This reaction is conducted in the presence of an acid catalyst, preferably a Lewis acid, such as those set forth above. An especially preferred catalyst is a boron trifluoride-etherate complex. The condensation is effected at elevated temperatures, i.e., at temperatures in excess of room temperature; (in excess of about 25–30° C.). Temperatures in excess of about 100° C. are especially preferred for good yields. For example, when the reaction is conducted at about 25° C., the chromanone of Formula IX is obtained only in about 20 percent yield. At a temperature of about 125° C., however, the chromanone is obtained at about 50 percent yield.

The second step of this sequence comprises the base-catalyzed reaction of an alkyl formate with a chromanone of Formula IX. Suitable bases for use as catalysts in this step are the strong bases, including alkali metal alkoxides, such as potassium t-butoxide, and alkali metal hydrides, such as sodium hydride. The reaction conditions are not critical, although elevated temperatures are normally employed.

The final steps in this sequence comprises the base-catalyzed reaction of the hydroxymethylenechromanone (X) with methyl vinyl ketone. This condensation may be promoted by any base, including weak bases such as trimethylamine, and strong bases such as potassium hydroxide. Strong bases are preferred, however, because they are necessary to effect cyclization and thus form the tricyclic intermediate of Formula VII. The remaining conditions are not narrowly critical. It is generally preferred, however, to conduct the reaction at a temperature of from about room temperature to about 100° C.

The compounds of Formula I are produced from the compounds of Formula III by one of two reaction sequences. In the first sequence the tetrahydro compounds of Formula Ia and Ib are obtained by the following reaction scheme:

of its 1-ether, for example, the tetrahydropyranyl ether, or lower acyl ester, such as the acetate. Otherwise, the reaction leaves a substantial amount of unreacted (III), which is difficult to separate from the 9-hydroxy compound (XI).

The 9-hydroxy compound of Formula XI can be dehydrated to form a compound of Formulae Ia or Ib. This dehydration is effected, for example, by treatment with acid catalyst, such as p-toluenesulfonic acid, while removing the water of dehydration as an azeotrope with a suitable solvent such as benzene, toluene, and the like. When the compound of Formula XI is the 6a,10-cis-iso-

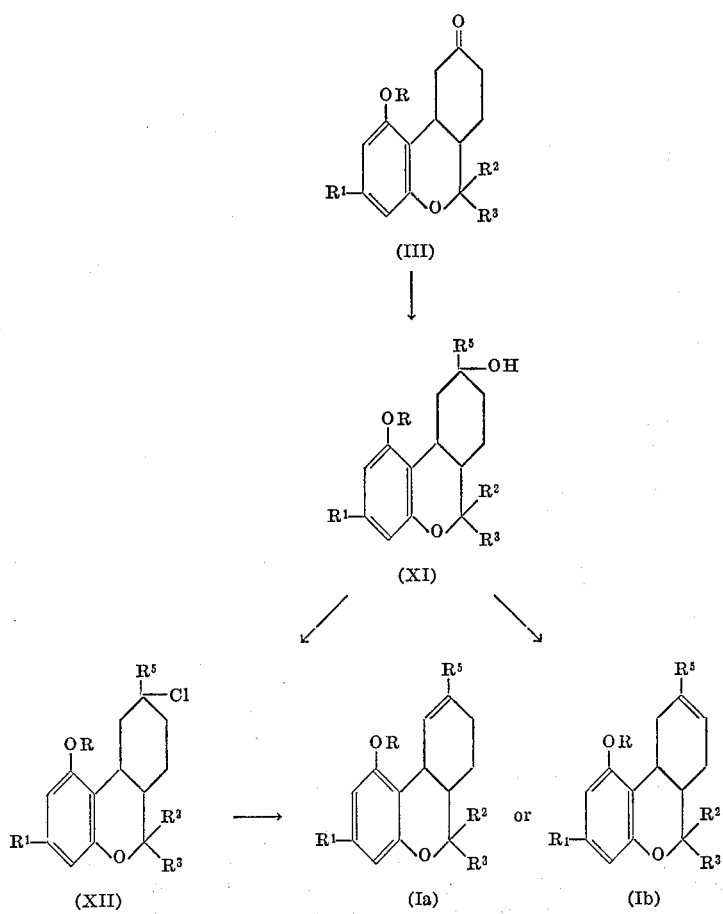

wherein R, R¹, R², R³, and R⁵ are as defined above.

In this scheme the compound of Formula III is converted to a 9-hydrocarbyl-9-hydroxy compound of Formula XI, which is converted to the compound of Formulae Ia or Ib, either directly, or indirectly through the 9-chloro compound, of Formula XII.

The 9-hydroxy compounds of Formula XI are produced from the compounds of Formula III by a Grignard reaction similar to those discussed above, i.e., by reaction of a compound of Formula I with a hydrocarbyl magnesium halide. Alternatively, one can employ a hydrocarbyl alkali metal compound of an alkali metal having an atomic number of from 3 to 79, i.e., lithium, sodium or potassium. Suitable Grignard reagents include methyl magnesium bromide, vinyl magnesium bromide, ethinyl magnesium bromide, methyl lithium, potassium acetylide, and the like.

When the compound of Formula III is the cis-isomer, this Grignard reaction proceeds rapidly to the 9-hydroxy compounds of Formula XI. When the trans-isomer is employed, however, it is preferred that it be in the form mer, the product of this dehydration is a Δ⁹-isomer of Formula Ia. On the other hand, when the compound of Formula XI is the trans-isomer, the product is a Δ⁸-compound of Formula Ib.

As an alternative to this dehydration step, one may chlorinate diol (XI) to form the 9-chloro compound of Formula XII. This chlorination may be effected in any acidic system containing chloride ion, for example, by treatment with anhydrous hydrogen chloride, and the like. A preferred system comprises the use of the known Lucas reagent, i.e., a zinc chloride-hydrogen chloride system. This reaction is normally conducted at room temperature, although higher and lower temperatures can be employed.

The resulting chloro compounds (XII), must have a free hydroxyl group in the 1-position, is dehydrochlorinated in the presence of base in known manner to form a compound of formulae Ia or Ib. When the 9-chloro compound of Formulae XII is the cis-iomer, one obtains the Δ⁹-isomer of Formula Ia. On the other hand, when the 9-chloro compound of Formula XII is the trans-isomer, one obtains a mixture of the $\Delta^8$- and $\Delta^9$-isomers, with one or the other predominating, depending upon the catalyst and solvent system employed. Thus, the $\Delta^9$-isomer (Ia) predominates when the dehydrochlorination is effected in the presence of an aprotic base, such as potassium t.-butoxide or sodium hydride, and an aprotic solvent, such as ether, tetrahydrofuran, dimethyl sulfoxide, dimethylformamide, or dimethylacetamide. When other systems in which either the base or the solvent or both are protic, such as an alkali metal hydroxide as a catalyst, or an alcohol as a solvent, the product will be predominantly the $\Delta^8$-isomer of Formula Ib.

The $\Delta^8$- and $\Delta^9$-isomers may be separated by conversion to their m-nitrobenzene sulfonate esters. The $\Delta^9$-esters are less soluble in methanol than the $\Delta^8$-esters. Thus, on cooling a hot solution of the isomeric esters in methanol, the $\Delta^9$-esters precipitate, while the $\Delta^8$-esters are retained in a liquid phase.

The second route to the compounds of Formula I comprises reacting a compound of Formula III with a hydrocarbylidene triphenylphosphorane, thereby producing an exocyclic olefinic compound of the Formula Ic above. These triphenylphosphorane compounds are represented by the formula:

$$(C_6H_5)_3P=R^6 \qquad (XIII)$$

wherein $R^6$ is as defined above, and include methylenetriphenylphosphorane,
ethylidenetriphenylphosphorane,
propylidenetriphenylphosphorane,
isopropylidenetriphenylphosphorane,
butylidenetriphenylphosphorane,
allyidenetriphenylphosphorane,
2-butenylidenetriphenylphosphorane,
2-isobutenylidenetriphenylphosphorane, and the like. Alternatively, one may employ phosphoranes wherein the phenyl group is substituted by lower alkyl, lower alkoxy or di(lower alkyl)amino, such as methylenetri-p-tolylphosphorane,
methylenetri(p-methoxyphenyl)-phosphorane,
methylenetri(o-methoxyphenyl)phosphorane,
methylenetri(p-dimethylaminophenyl)phosphorane, and the like. Of these triphenylphosphorane derivatives, it is preferred to employ the base-substituted hydrocarbylidene-tri(p-dilower alkylphenyl) - phosphoranes. This reaction is the well known Wittig reaction, and accordingly, the reaction conditions are not critical to this invention.

The various products of Formula I which are produced in accordance with this invention are members of a class of generally known compounds. Of these compounds, the 6a, 10a-transisomers possess psychotropic and analgesic activity, and accordingly, the trans-intermediates of this invention are preferred. Especially preferred are the intermediates leading to trans-$\Delta^8$- and $\Delta^9$-tetrahydrocannabinols, which are active constituents of marihuana.

The following examples are illustrative. In these examples all the assigned structures have been confirmed by infrared, ultraviolet, and nuclearmagnetic resonance analysis.

EXAMPLE 1

Ethyl 4-methyl-5-hydroxy-7-pentylcoumarin-3-propionate

To a stirred solution of 83.3 grams (0.46 mole) of olivetol (5-pentylresorcinol) and 110 grams (0.48 mole) of diethyl α-actogulutarate in 600 milliliters of benzene was added 42.2 milliliters (70.7 grams, 0.46 mole) of phosphorus oxychloride. After stirring for 5 days at room temperature the heterogeneous reaction mixture was cooled to an internal temperature of 5° C. and 250 milliliters of ice and water was added. The mixture was allowed to warm to room temperature and after 30 minutes enough chloroform was added to dissolve the precipitated solid. The organic layer was washed with water, dried over sodium sulfate and the chloroform evaporated. The residual solid upon recrystallization from benzene gave in several crops 118.5 grams of ethyl 4-methyl-5-hydroxy-7-pentylcourmarin - 3 - propionate as colorless crystals, melting point 119–121° C. After further recrystallization the product melted at 123–124° C.

*Analysis.*—Calculated for $C_{20}H_{26}O_5$ (percent): C, 69.34; H, 7.57. Found (percent): C, 69.28; H, 7.21.

In a similar manner ethyl esters of 4-methyl-5-hydroxy-7-methylcoumarin - 3 - propionic acid and 4-methyl-5-hydroxy - 7 - (1'-n-propylpentyl)coumarin - 3 - propionic acid are produced by substituting 5-methylresorcinol and 5-(1' - n - propylpentyl)resorcinol, respectively, for the olivetol.

EXAMPLE 2

7,10-dihydro-1-hydroxy-3-pentyl-6H-dibenzo[b,d]pyran-6,9(8H)-dione

To the sodium hydride obtained by washing 56.0 grams (1.17 mole) of a 50 percent sodium hydride in mineral oil dispersion with dry hexane was added 101 grams (0.291 mole) of ethyl 4-methyl-5-hydroxy-7-pentylcoumarin-3-propionate and the two powders were mixed thoroughly. The reaction flask was cooled to 15–17° C. and 1000 milliliters of dimethyl sulfoxide was distilled from calcium hydride directly into the reaction flask. After stirring for an additional hour at 15–17° C. the reaction was kept overnight in the refrigerator. After warming to room temperature the reaction mixture was poured into a rapidly stirred mixture of 4 liters of ice and water and 400 milliliters of 6 N hydrochloric acid, more ice being added as needed to keep the mixture cold. After stirring for an additional hour the slurry was filtered and the solids washed well with water. The wet filter cake was then added to a separatory funnel containing 2 liters of methyl ethyl ketone and 1 liter of 5 percent sodium bicarbonate solution. The methyl ethyl ketone layer was washed with bicarbonate solution and the combined bicarbonate washes were extracted once with methyl ethyl ketone. The combined organic layers were then dried over sodium sulfate and concentrated to a tan solid. Recrystallization from acetone gave 52.43 grams (60 percent) of 7,10-dihydro - 1 - hydroxy - 3 - pentyl-6H-dibenzo[b,d]pyran-6,9(8H)-dione as colorless crystals, melting point 203–206° C. After recrystallization from acetonitrile, the product melted at 205.5–207.5° C.

*Analysis.*—Calc'd for $C_{18}H_{20}O_4$ (percent): C, 71.98; H, 6.71. Found (percent): C, 71.85; H, 6.85.

EXAMPLE 3 d,l,1-hydroxy-3-pentyl-6,6-dimethyl-6a,7-dihydro-6H-dibenzo[b,d]pyran-9(8H)-one

A solution of 9.22 grams (0.031 mole) of 7,10-dihydro-1-hydroxy-3-pentyl-6H-dibenzo[b,d]pyran-6,9(8H) - dione in 500 milliliters of benzene containing 10 milliliters of ethylene glycol and 10 milligrams of p-toluenesulfonic acid was heated under reflux under a Dean-Stark trap overnight. The cooled solution was poured into water containing an excess of sodium bicarbonate. The organic layer was dried over sodium sulfate and evaporated to a yellow oil, which upon crystallization from dichloromethane-ether gave 9.91 grams (94 percent) of 7,8,9,10-tetrahydro - 1 - hydroxy - 3 - pentylspiro(6H-dibenzo[b,d]pyran-9,2'-[1',3']dioxolan)-6-one as colorless crystals, melting point 112–114° C. Recrystallization from ether raised the melting point to 114.5–116° C.

*Analysis.*—Calc'd for $C_{20}H_{24}O_5$ (percent): C, 69.75; H, 7.02. Found (percent): C, 69.61; H, 7.31.

A slurry of 27.0 grams (0.078 mole) of the thus produced ketal in 750 milliliters of ether was added over 45 minutes to the Grignard reagent prepared from 18.24 grams (0.75 gram atom) of magnesium and 45.75 milliliters (104 grams, 0.73 mole) of methyl iodide in 900 milliliters of ether. After refluxing overnight, the reaction was treated carefully with water, and 300 milliliters of 6 N hydrochloric acid was added. The mixture was stirred vigorously for 1 hour and then the ether layer and a chloroform extract of the aqueous layer were filtered through a column of alumina. Concentration of the eluates gave a yellow solid which soon turned green. Recrystallization from methanol gave 16.3 grams (66 percent) of d,l-1-hydroxy-3-pentyl-6,6-dimethyl - 6a,7 - dihydro - 6H-dibenzo[b,d]pyran-9(8H)-one as yellow crystals, melting point 196–199° C. After recrystallization from dichloromethane-ether, the product melted at 198–199° C.

Analysis.—Calc'd for $C_{20}T_{26}O_3$ (percent): C, 76.40; H, 8.34. Found (percent): C, 76.27; H, 8.66.

In a similar manner, the analogous 6,6-diethyl- and 6,6-dipropyl-compounds are prepared by substituting ethyl bromide and propyl bromide for the methyl iodide.

EXAMPLE 4

2,2-dimethyl-5-hydroxy-7-pentyl-4-chromanone

A mixture of 73 grams (0.4 mole) of olivetol (5-pentylresorcinol) and 47 grams (0.47 mole) of 3-methylcrotonic acid was heated by an oil bath to 125° C. Through the condenser, 94 milliliters of boron trifluoride-etherate was added and the solution was heated under reflux overnight. The partially cooled reaction was cautiously diluted with 100 milliliters of water followed by 425 milliliters of 6 N sodium hydroxide and then boiled on the steam bath for 5 minutes. The solution was cooled, acidified with 6 N hydrochloric acid and extracted with ether. The ether extracts were washed in sequence with water, dilute sodium bicarbonate and water and then dried over sodium sulfate and concentrated to 106 grams of a tan oil. This was then dissolved in ether and extracted repeatedly with 1 N sodium hydroxide solution. The ether layer upon drying and evaporation then gave 53.1 grams (50 percent) of crude 2,2 - dimethyl - 5 - hydroxy - 7 - pentyl-4-chromanone as a light tan oil. Repeated recrystallization from methanol at Dry Ice temperature gave a sample as tan crystals, melting point 23–27° C., normally handled as an oil.

Analysis.—Calc'd for $C_{16}H_{22}O_3$ (percent): C, 73.25; H, 8.45. Found (percent): C, 73.02; H, 8.75.

In a similar manner, 5-hydroxy-7-pentyl-4-chromanone and 2-methyl-5-hydroxy-7-pentyl-4-chromanone are prepared by substituting acrylic acid and crotonic acid, respectively, for the 3-methylcrotonic acid.

EXAMPLE 5

2,2-dimethyl-5-hydroxy-3-hydroxymethylene-7-pentyl-4-chromanone

To the sodium hydride obtained by washing with hexane 78.5 grams (1.64 mole) of a 50 percent sodium hydride in mineral oil dispersion was added a solution of 46.1 grams (0.175 mole) of 2,2-dimethyl-5-hydroxy-7-pentyl-4-chromanone in 172 milliliters (159 grams, 2.15 mole) of ethyl formate under a Dry Ice condenser. After adding 4.4 liters of ether and heating under reflux overnight, the reaction was cooled and acidified with 1 N hydrochloric acid. The ether layer and two ether washes of the aqueous layer were washed with 1 N hydrochloric acid, and twice with water and then extracted five times with 1 N sodium hydroxide. These basic extracts were acidified and extracted with ether. The ether extract was dried over sodium sulfate and concentrated to 27.5 grams (54 percent) of crude 2,2-dimethyl-5-hydroxy-3-hydroxymethylene-7-pentyl-4-chromanone as a yellow oil. Crystallization and recrystallization from hexane gave a sample as yellow crystals, melting point 31–32.5° C.

Analysis.—Calc'd for $C_{17}H_{22}O_4$ (percent): C, 70.32; H, 7.64. Found (percent): C, 70.60; H, 7.89.

EXAMPLE 6 d,l-1-hydroxy-3-pentyl-6,6-dimethyl-6a,7-dihydro-6H-dibenzo[b,d]-pyran-9(8H)-one To a solution of 8.33 grams (0.029 mole) of crude 2,2-dimethyl-5-hydroxy-3-hydroxymethylene - 7 - pentyl-4-chromanone in 43 milliliters of methanol and 4.25 milliliters of methyl vinyl ketone was added 1.0 milliliter of triethylamine. After standing at room temperature overnight, the solution was diluted with 500 milliliters of ether and extracted 4 times with 10 percent sodium carbonate solution. The ether solution was dried over sodium sulfate and concentrated. The residue, which weighed 8.43 grams, was heated under reflux overnight with 84.3 milliliters of ethanol and 84.3 milliliters of 2 N potassium hydroxide solution. The cooled solution was acidified with 6 N hydrochloric acid and extracted with dichloromethane. The extracts were dried over sodium sulfate and concentrated and the residue was crystallized from dichloromethane-ether to give 4.11 grams (35 percent) of d,l-1-hydroxy-3-pentyl-6,6-dimethyl-6a,7-dihydro-6H-dibenzo[b,d] - pyran - 9(8H)-one as yellow crystals, melting point 195–198° C. Further recrystallization gave pale yellow crystals, melting point 197.5–199° C. undepressed on admixture with a sample prepared as described in Example 3.

EXAMPLE 7 d,l-1-hydroxy-3-pentyl-6,6-dimethyl-6aβ,7,10,10aα-tetrahydro-6H-dibenzo[b,d]pyran-9(8H)-one A solution of 11.5 grams (0.0366 mole) of d,l-1-hydroxy-3-pentyl - 6,6 - dimethyl - 6a,7-dihydro-6H-dibenzo[b,d]pyran-9(8H)-one in 100 milliliters of tetrahydrofuran was added slowly to a rapidly stirred solution of 400 milligrams of lithium in 500 milliliters of liquid ammonia (distilled through potassium hydroxide pellets) kept at Dry Ice temperature. Whenever the blue color began to fade, addition of d,l-1-hydroxy-3-pentyl-6,6-dimethyl-6a,7-dihydro-6H-dibenzo[b,d]pyran - 9(8H) - one was stopped, more lithium was added, and addition of d,l - 1 - hydroxy - 3 - pentyl - 6,6 - dimethyl - 6a,7 - dihydro-6H - dibenzo[b,d]pyran - 9(8H) - one was then resumed. This process was repeated until a permanent blue color persisted after the complete addition of d,l-1-hydroxy-3-pentyl - 6,6 - dimethyl - 6a,7 - dihydro - 6H - dibenzo[b,d]pyran-9(8H)-one. A total of 1.04 grams (0.15 gram atom) of lithium was added. Stirring was continued for an additional 5 minutes and the blue color was discharged by the addition of ammonium chloride. The ammonia was allowed to evaporate and the residue was diluted with 500 milliliters of water, acidified with hydrochloric acid and extracted with dichloromethane. The extracts were dried over sodium sulfate and concentrated to an oil. Crystallization from dichloromethane-hexane gave a total of 9.13 grams of colorless crystals (79 percent) of a mixture of d,l-1-hydroxy-3-pentyl-6,6-dimethyl-6aβ,7,10,10aα - tetrahydro - 6H - dibenzo[b,d]pyran - 9 (8H)-one and its 6aβ,10aβ-isomer. This material was then recrystallized from methanol-water to give 6.09 grams (52.7 percent) of the trans-ketone, free of the cis-ketone, as determined by thin layer chromatography, melting point 162–164° C. Further crystallization from dichloromethane-hexane yielded a sample of the trans-ketone as colorless crystals, melting point 163–165° C.

Analysis.—Calculated for $C_{20}H_{28}O_3$ (percent): C, 75.91; H, 8.92. Found (percent): C, 75.87; H, 8.89.

The mother liquors from several of these reductions were combined and chromatographed over silica gel. Later benzene fractions contained essentially pure trans-isomer. Recrystallization from methanol-water then gave an amount of the trans-ketone, melting point 162–165° C., corresponding to a total yield of the trans-isomer of 59 percent. Further elution with benzene and with mixtures of benzene and ether gave mixtures of the trans- and cis-ketones until 3:1 benzene and ether gave a small amount of solid which upon recrystallization from ether gave the cis-ketone as colorless crystals, melting point 148–150° C., undepressed upon admixture with an authentic sample of cis-ketone prepared as described in Example 13.

EXAMPLE 8 d,l-3-pentyl-6,6,9β-trimethyl-6aβ,7,8,9,10,10aα-hexahydro-6H-dibenzo[b,d]pyran-1,9α-diol A mixture of 5.00 grams (0.016 mole) of d,l-1-hydroxy-3-pentyl - 6,6 - dimethyl - 6aβ,7,10,aα-tetrahydro-6H-dibenzo[b,d]pyran-9(8H)-one, 300 milliliters of chloroform, 0.5 milliliters of concentrated hydrochloric acid and 16.3 milliliters of dihydropyran was stirred at room temperature overnight. The reaction mixture was poured into an excess of dilute sodium bicarbonate solution and the chloroform layer was dried over sodium sulfate and evaporated to a yellow-green oil. This was dissolved in 50 milliliters of ether and added over 5 minutes to a refluxing solution of methyl magnesium iodide prepared from 3.90 grams (0.16 gram atom) of magnesium and 10.0 milliliters (22.8 grams, 0.16 mole) of methyl iodide in 200 milliliters of ether. After being heated under reflux for 90 minutes, the reaction was cooled in an ice bath. Water was added carefully to destroy the excess Grignard reagent and then enough dilute hydrochloric acid was added to form two clear layers. The organic layer was diluted with ether and, after being washed with water, sodium bicarbonate solution and water, was dried over sodium sulfate and concentrated. The residue was dissolved in a mixture of 100 milliliters of ether, 60 milliliters of 6 N hydrochloric acid and 300 milliliters of methanol. The reaction was stirred at room temperature overnight, diluted with 1 liter of ether and washed with water, dilute sodium bicarbonate and finally with water. The ether layer was dried over sodium sulfate and evaporated to a yellow oil which upon crystallization and recrystallization from ether-hexane gave 1.65 grams (31.4 percent) of d,l-3-pentyl-6,6,9β-trimethyl-6aβ,7,8,9, 10,10aα-hexahydro-6H-dibenzo[b,d]pyran - 1,9α - diol as colorless crystals, melting point 160–162° C. After further recrystallization from ether-hexane, the product melted at 162–163° C.

*Analysis.*—Calculated for $C_{21}H_{32}O_3$ (percent): C, 75.86; H, 9.70. Found (percent): C, 75.97; H, 9.88.

In a similar manner, the analogous 9β-ethyl- and 9β-propyl-compounds are prepared by substituting ethyl bromide and propyl bromide, respectively, for methyl iodide.

EXAMPLE 9 d,l-3 - Pentyl - 6,6,9-trimethyl - 6aβ,7,10,10aα - tetrahydro - 6H-dibenzo - [b,d]pyran - 1-ol, (d,l - Δ⁸-tetrahydrocannabinol)

A solution of 500 milligrams (1.5 millimoles) of d,l-3-pentyl - 6,6,9β - trimethyl-6aβ,7,8,9,10,10aα-hexahydro-6H - dibenzo-[b,d]pyran - 1,9α - diol and 50 milligrams of p-toluenesulfonic acid in 50 milliliters of benzene was heated under reflux with a Dean-Stark trap for 30 minutes. The cooled solution was passed over a small column of silica gel and the benzene eluates were evaporated to give 454 milligrams (96 percent) of d,l-Δ⁸-tetrahydrocannabinol as a colorless oil, only one isomer by v.p.c. and with spectra identical with those of the analytical sample.

To 35 milliliters of benzene containing 2 drops of pyridine was added 350 milligrams (1.1 millimoles) of the d,l-Δ⁸-tetrahydrocannabinol and one-third of the solvent was distilled out. The solution was cooled to room temperature under a drying tube and 278 milligrams (1.3 millimoles) of 3,5-dinitrophenyl isocyanate was added. After stirring overnight a small amount of solid was removed by filtration and the yellow filtrate was absorbed onto alumina. Elution with benzene gave a colorless eluate and a light yellow band on the upper portion of the column. Concentration of the eluate gave colorless crystals which upon one recrystallization from ether-hexane afforded 330 mg. of the 3,5-dinitrophenylurethan of d,l-Δ⁸-tetrahydrocannabinol, melting point 208–209.5° C. A 180-milligram portion of this solid was stirred with 1.1 milliliters of 1 N sodium hydroxide solution in 50 milliliters of methanol overnight. The solution was poured into a mixture of ether and excess dilute hydrochloric acid. The ether layer was washed with water, dried over sodium sulfate, and concentrated. The residue was dissolved in benzene and passed over alumina. The upper portion of the column was bright yellow and the colorless benzene eluate was evaporated to give 90 milligrams of d,l-Δ⁸-tetrahydrocannabinol as a colorless oil.

*Analysis.*—Calculated for $C_{21}H_{30}O_2$ (percent): C, 80.27; H, 9.62, Found (percent): C, 80.30; H, 9.73.

EXAMPLE 10 d,l-3-pentyl-6,6-dimethyl-9-ethynyl-6aβ,7,8,9,10,10aα-hexahydro-6H-dibenzo[b,d]pyran-1,9-diol Acetylene was bubbled through a solution of 1.80 grams of potassium t-butoxide in 50 milliliters of t-butyl alcohol and 5 milliliters of toluene for 3½ hours. Over a 3½ hour period a solution of 500 milligrams (1.6 millimoles) of d,l-1-hydroxy - 3-pentyl-6,6 - dimethyl - 6aβ,7,10,10aα-tetrahydro-6H-dibenzo[b,d]pyran-9(8H)-one in 20 milliliters of toluene was added with continuous acetylene flow which was continued for a further 16 hours. The reaction mixture was flushed with nitrogen, diluted with water, acidified with acetic acid, and extracted with ether. The ether layer was washed with water, aqueous sodium bicarbonate and again with water and then dried over sodium sulfate and evaporated. Recrystallization of the residue from a mixture of ether and hexane gave 210 milligrams (39 percent) of d,l-3-pentyl - 6,6-dimethyl - 9-ethynyl-6aβ,7,8,9,10,10aα - hexahydro - 6H-dibenzo[b,d]pyran-1,9-diol, melting point 168–170.5° C.

*Analysis.*—Calculated for $C_{22}H_{30}O_3$ (percent): C, 77.15; H, 8.83. Found (percent): C, 77.45; H, 8.86.

By procedures similar to those described in Example 9, this product is converted to d,l-3-pentyl-6,6-dimethyl-9-ethynyl - 6aβ,7,10,10aα - tetrahydro - 6H-dibenzo[b,d]pyran-1-ol.

EXAMPLE 11 d,l-3-pentyl-9-chloro-6,6,9-trimethyl-6aβ,7,8,9,10,10aα-hexahydro-6H-dibenzo[b,d]pyran-1-ol A slurry of 10.00 grams (0.0316 mole) of d,l - 1 - hydroxy-3 - pentyl-6,6 - dimethyl-6aβ,7,10,10aα - tetrahydro-6H-dibenzo[b,d]-pyran-9(8H)-one in 100 milliliters of ether was added over 15 minutes to a solution of methyl magnesium iodide prepared from 7.0 grams (0.29 gram atom) of magnesium and 18.0 milliliters (41.0 grams, 0.29 mole) of methyl iodide in 500 milliliters of ether. The reaction mixture was heated under reflux for 90 minutes and cooled in an ice bath. Water was carefully added to decompose the excess Grignard reagent and enough 6N hydrochloric acid was added to give 2 clear layers. The organic layer was diluted with 600 milliliters of ether and washed twice with water, twice with dilute sodium bicarbonate, twice with water and finally with brine. The solution was dried over sodium sulfate and concentrated. To a solution of the residue in 150 milliliters of glacial acetic acid was added a solution of 103 grams of zinc chloride in 80 milliliters of concentrated hydrochloric acid. After stirring at room temperature for 90 minutes the reaction mixture was poured into a mixture of 3 liters of water and 2.4 liters of ether. The ether layer was washed 5 times with 1.5 liters of water each time, dried over sodium sulfate, and evaporated. The residue, which contained the d,l-3 - pentyl-9-chloro - 6,6,9 - trimethyl-6aβ, 7,8,9,10,10aα-hexahydro-6H-dibenzo[b,d]pyran-1-ol, was dissolved in benzene and absorbed on a column of silica gel. The column was eluted with benzene until thin layer chromatograms showed that no more of the chloro-product was being eluted. The column was then eluted with ether and these ether eluates were worked up to give 3.64 grams of recovered starting material. The benzene eluates were evaporated and crystallized from hexane to give 3.45 grams (49 percent, based on unrecovered starting material) of the chloro-alcohol as light tan crystals, melting point 85–88° C. After recrystallization from hexane, the chloro-alcohol was obtained as colorless crystals, melting point 87–90° C.

*Analysis.*—Calculated for $C_{21}H_{31}ClO_2$ (percent): C, 71.88; H, 8.90; Cl, 10.10. Found (percent): C, 71.92; H, 9.02; Cl, 10.06

Treatment of the mother liquors with the Lucas reagent as above gave another 0.77 gram (60 percent total) of the chloro-alcohol as colorless crystals, melting point 84–89° C. The same product is obtained in 60 percent yield by the reaction of d,l-3-pentyl-6,6,9$\beta$-trimethyl-6a$\beta$, 7,8,9,10,10a$\alpha$-hexahydro-6H - dibenzo[b,d]pyran - 1,9$\alpha$-diol with the Lucas reagent in the same manner.

EXAMPLE 12 d,l-$\Delta^9$-tetrahydrocannabinol

To a slurry of the sodium hydride from 1.00 gram (0.02 mole) of 50 percent sodium hydride in mineral oil dispersion (washed free of mineral oil with dry hexane) in 200 milliliters of tetrahydrofuran (distilled from lithium aluminum hydride) was added 1.00 gram (0.00285 mole) of d,l-3-pentyl-9-chloro-6,6,9-trimethyl-6a$\beta$,7,8,9, 10,10$\alpha$-hexahydro-6H-dibenzo[b,d]pyran-1-ol. The reaction mixture was heated under reflux with stirring overnight, cooled to room temperature and carefully poured into a mixture of water and ether. The ether layer was washed with four 500-milliliter portions of water each, dried over sodium sulfate, and concentrated to 875 milligrams (98 percent) of a yellow oil. Vapor phase chromatographic analyses of this oil showed the presence of d,l-$\Delta^9$- and $\Delta^8$-tetrahydrocannabinols in the ratio of 74 to 26 percent accompanied by only traces of other components.

To a solution of 500 milligrams (1.6 millimoles) of the 74: 26 tetrahydrocannabinol mixture in 10 milliliters of dry pyridine was added 700 milligrams (3.2 millimoles) of m-nitrobenzenesulfonyl chloride. The solution was heated at 60° C. for 8 hours and then at 75° C. for 4 hours at which time thin layer chromatography indicated that the reaction was complete. The cooled reaction mixture was poured into a mixture of ether and dilute hydrochloric acid. The ether layer was washed with dilute hydrochloric acid, water, dilute sodium bicarbonate and finally with water and dried over sodium sulfate and evaporated. The residue was recrystallized repeatedly from methanol to give 180 milligrams (23 percent) of $\Delta^9$-tetrahydrocannabinol m-nitrobenzene sulfonate as very pale yellow crystals, melting point 106–107.5° C.

*Analysis.*—Calculated for $C_{27}H_{33}NO_6S$ (percent): C, 64.91; H, 6.66; N, 2.80; S, 6.42. Found (percent): C, 64.64; H, 6.36; N, 2.70; S, 6.78.

A solution of 1.69 grams (3.4 millimoles) of the nitrobenzene sulfonate in 600 milliliters of methanol containing 25 milliliters of 1N sodium hydroxide was heated under reflux until thin layer chromatography indicated the reaction was complete (45 minutes). The cooled reaction mixture was poured into ether and dilute hydrochloric acid. The organic layer was washed with water, dilute sodium bicarbonate and finally with water. It was dried and evaporated to a pale tan oil which on crystallization and recrystallization from hexane gave 0.89 gram (84 percent) of d,l-$\Delta^9$-tetrahydrocannabinol as very light tan crystals, melting point (vac.) 60–62° C.

*Analysis.*—Calculated for $C_{21}H_{30}O_2$ (percent): C, 80.21; H, 9.62. Found (percent): C, 80.34; H, 9.54.

EXAMPLE 13 d,l-3-pentyl-6,6-dimethyl-9-methylene-6a-$\beta$,7,8,9,10,10a$\alpha$-hexahydro-6H-dibenzo[b,d]pyran-1-ol A slurry of sodium hydride [obtained by washing with dry hexane 1.52 grams (0.032 mole) of 50 percent sodium hydride in mineral oil dispersion] in 60 milliliters of dimethylsulfoxide was heated at 50° C. until solution took place (about 3 hours). After addition of 11.86 grams (0.034 mole) of triphenylmethylphosphonium bromide, the reaction mixture was heated at 70° C. for 3 hours. A solution of 1.00 gram (0.0032 mole) of d,l-1-hydroxy - 3 - pentyl - 6,6 - dimethyl - 6a$\beta$,7,8,9,10,10a$\alpha$-tetrahydro-6H-dibenzo[b,d]pyran-9(8H)-one in 60 milliliters of dimethylsulfoxide was added and the reaction mixture was heated at 70° C. overnight. The cooled reaction mixture was poured into a mixture of ice and water containing 20 grams of sodium bicarbonate. This was extracted with benzene and the organic layer was washed with water, dried over sodium sulfate and evaporated to 6.15 grams of a tan oil containing triphenylphosphine oxide by thin layer chromatography. This oil was passed over silica gel in 1:1 hexane-benzene to give 1.57 grams of a colorless oil containing an odorous impurity. This oil was absorbed onto silica gel in hexane and the first hexane eluates contained the impurity. Later hexane eluates were evaporated to give 0.59 gram (59 percent) of d,l-3-pentyl-6,6-dimethyl-9-methylene-6a$\beta$,7,8,9, 10,10a$\alpha$-hexahydro-6H-dibenzo[b,d]pyran-1-ol as a colorless oil.

*Analysis.*—Calculated for $C_{21}H_{30}O_2$ (percent): C, 80.21; H, 9.62. Found (percent): C, 79.95; H, 9.91.

In a similar manner, the 9-ethylidene- and the 9-allylidene-analogs are prepared by substituting triphenylethylphosphonium bromide and triphenylallylphosphonium bromide, respectively, for the triphenylmethylphosphonium bromide.

EXAMPLE 14 d,l-1-hydroxy-3-pentyl-6a$\beta$,7,8,9,10,10a$\beta$-hexahydrospiro-(6H-dibenzo[b,d]pyran-9,2'-[1',3']dioxolan)-6-one A solution of 5.00 grams (0.0145 mole) of 7,8,9,10-tetrahydro - 1 - hydroxy - 3 - pentylspiro(6H-dibenzo-[b,d]pyran - 9',2'[1',3]dioxolan)-6-one in 100 milliliters of ether was subjected to hydrogenation at 2150 pounds pressure and 130° C. for 2 hours in the presence of 0.5 gram of Raney nickel. The catalyst-free solution was evaporated to a crystalline residue which on recrystallization from ether-hexane gave 3.53 grams (70 percent) of hexahydro product as colorless crystals, melting point 142.5–143.5° C. Further recrystallization from ether-hexane yielded a sample melting at 143–144° C.

*Analysis.*—Calculated for $C_{20}H_{26}O_5$ (percent): C, 69.3; H, 7.57. Found (percent): C, 69.02; H, 7.30.

EXAMPLE 15 d,l-1-hydroxy-3-pentyl-6,6-dimethyl-6a$\beta$-7,19,10a$\beta$-tetrahydro-6H-dibenzo[b,d]pyran-9(8H)-one A slurry of 3.60 grams (0.014 mole) of d,l-1-hydroxy-3 - pentyl - 6a$\beta$,7,8,9,10,10a$\beta$ - hexahydrospiro(6H - dibenzo[b,d]pyran-9,2'-[1',3']dioxolan)-6-one in 180 milliliters of ether was added over 30 minutes to a methyl magnesium iodide solution prepared from 11.1 milliliters (25.3 grams, 0.18 mole) of methyl iodide and 4.32 grams (0.18 gram atom) of magnesium in 180 milliliters of ether under argon. The reaction mixture wos heated under reflux overnight and 1N hydrochloric acid was carefully added until two clear layers were obtained. The aqueous layer was washed with dichloromethane and the combined organic layers were concentrated. The residue was mixed with 80 milliliters of methanol and 40 milliliters of 3N hydrochloric acid and heated under reflux for 2 hours. The cooled reaction was diluted with 500 milliliters of water and extracted with dichloromethane. The extracts were dried over sodium sulfate and concentrated to a crystalline residue which on recrystallization from ether gave 1.73 grams (53 percent) of d,l-1-hydroxy-3-pentyl - 6,6 - dimethyl - 6aβ,7,10,10aβ - tetrahydro - 6H-dibenzo[b,d]pyran-9(8H)-one as colorless crystals, melting point 148–150° C. Further recrystallization from etherhexane raised the melting point to 149.5–150.5° C.

*Analysis.*—Calculated for $C_{20}H_{28}O_3$ (percent): C, 75.91; H, 8.92. Found (percent): C, 76.01; H, 8.88.

EXAMPLE 16 d,l-3-pentyl-6,6,9-trimethyl-6aβ,7,8,9,10,10aβ-hexahydro-6H-dibenzo[b,d]pyran-1,9-diol A slurry of 500 milligrams (1.58 millimoles) of d,l-1-hydroxy - 3 - pentyl - 6,6 - dimethyl-6aβ,7,10,10aβ-tetrahydro-6H-dibenzo[b,d]pyran-9-(8H)-one in 10 milliliters of ether was added to a solution of methyl magnesium iodide prepared from 106 milligrams (4.4 milligrams atom) of magnesium and 0.30 milliliter (0.68 gram, 4.8 millimoles) of methyl iodide in 10 milliliters of ether to give a clear reaction mixture. After heating under reflux for 1 hour the reaction was cooled in an ice bath and 1 N hydrochloric acid was added until two clear layers were formed. The organic layer was diluted with ether and washed twice with water, once with dilute sodium bicarbonate and again with water. The ether solution was dried over sodium sulfate and concentrated to an oil which on crystallization from hexane gave 380 milligrams (72 percent) of d,l - 3 - pentyl-6,6,9-trimethyl-6aβ,7,8,9,10,10aβ-hexahydro-6H-dibenzo[b,d]pyran - 1,9 - diol as colorless crystals, melting point 142–145° C.

*Analysis.*—Calculated for $C_{21}H_{32}O_3$ (percent): C, 75.86; H, 9.70. Found (percent): C, 76.07; H, 9.83.

EXAMPLE 17 d,l-3-pentyl-6,6,9-trimethyl-6aβ,7,8,10aβ-tetrahydro-6H-dibenzo-[b,d]pyran-1-ol

A solution of 828 milligrams (2.5 millimoles) of d,l-3-pentyl-6,6,9-trimethyl-6aβ,7,8,9,10,10aβ - hexahydro-6H-dibenzo[b,d]-pyran-1,9-diol and 50 milligrams of p-toluenesulfonic acid in 50 milliliters of benzene was heated under reflux for 30 minutes. The cooled solution was washed with dilute sodium bicarbonate, dried over sodium sulfate and evaporated to give 770 milligrams (98 percent) of d,l-3-pentyl-6,6,9-trimethyl-6aβ,7,8,10aβ-tetrahydro-6H-dibenzo[b,d]pyran-1-ol as a colorless oil.

*Analysis.*—Calculated for $C_{21}H_{30}O_2$ (percent): C, 80.21; H, 9.62. Found (percent): C, 79.87; H, 9.47.

EXAMPLE 18 d,l-3-pentyl-6,6-dimethyl-9-methylene-6aβ,7,8,9,10,10aβ-hexahydro-6H-dibenzo[b,d]pyran-1-ol A slurry of sodium hydride [obtained by washing with dry hexane 3.04 grams (0.063 mole) of 50 percent sodium hydride in mineral oil dispersion] in 120 milliliters of dimethylsulfoxide was heated at 50° C. until solution took place (about 30 minutes). After addition of 22.6 grams (0.063 mole) of triphenylmethyl-phosphonium bromide the reaction was heated at 70° C. for 3 hours. A solution of 2.00 grams (0.0063 mole) of d,l-1-hydroxy-3-pentyl - 6,6 - dimethyl - 6aβ,7,10,10aβ-tetrahydro-6H-dibenzo[b,d]pyran-9(8H)-one in 120 milliliters of tetrahydrofuran was added and the reaction mixture was heated under reflux overnight. The cooled reaction was poured into a mixture of ice and water containing 40 grams of sodium bicarbonate. This was extracted with benzene, and the extracts were dried over sodium sulfate and concentrated to a semicrystalline residue. Addition of ether and filtration gave two crops of triphenylphosphine oxide. The evaporated mother liquors were passed over silica gel in 1:1 hexane-benzene. The eluates were concentrated and crystallized from hexane at Dry Ice temperature to give 0.94 gram (47 percent) of d,l-3-pentyl-6,6-dimethyl-9-methylene - 6aβ,7,8,9,10,10aβ - hexahydro - 6H - dibenzo [b,d]pyran-1-ol as tan crystals, melting point 45–50° C.

Further recrystallization gave a sample as colorless crystals, melting point 48–52° C.

*Analysis.*—Calculated for $C_{21}H_{30}O_2$ (percent): C, 80.21; H, 9.62. Found (percent): C, 80.26; H, 9.21.

What I claim is:

1. A 6a,10a-trans compound as represented by the formula:

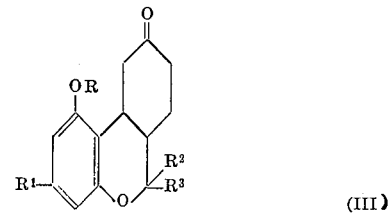

(III)

wherein

R is a member selected from the group consisting of hydrogen, lower alkyl, and lower alkanoyl;

$R^1$ is alkyl of from 1 to 10 carbons; and $R^2$ and $R^3$ each are members selected from the group consisting of hydrogen and lower alkyl.

2. A compound as claimed in claim 1 wherein R is hydrogen.

3. A compound as claimed in claim 2 wherein said $R^2$ and $R^3$ are both hydrogen.

4. A compound as claimed in claim 2 wherein one of said $R^2$ and $R^3$ is hydrogen and the other is alkyl.

5. A compound as claimed in claim 2 wherein $R^2$ and $R^3$ are both alkyl.

6. A compound as claimed in claim 5 wherein said $R^2$ and $R^3$ are both methyl.

7. A compound as claimed in claim 6 wherein $R^1$ is pentyl.

8. A compound as represented by the formula:

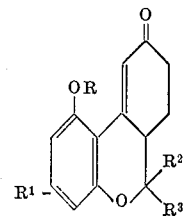

wherein

R is a member selected from the group consisting of hydrogen, lower alkyl, and lower alkanoyl;

$R^1$ is alkyl of from 1 to 10 carbons; and $R^2$ and $R^3$ each are members selected from the group consisting of hydrogen and lower alkyl.

9. A compound as claimed in claim 8 wherein R is hydrogen.

10. A compound as claimed in claim 9 wherein said $R^2$ and $R^3$ are both hydrogen.

11. A compound as claimed in claim 9 wherein one of said $R^2$ and $R^3$ is hydrogen and the other is alkyl.

12. A compound as claimed in claim 9 wherein $R^2$ and $R^3$ are both alkyl.

13. A compound as claimed in claim 12 wherein said $R^2$ and $R^3$ are both methyl.

14. A compound as claimed in claim 13 wherein said $R^1$ is pentyl.

15. A 6a,10a-trans compound as represented by the formula:

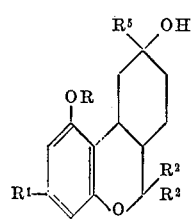

wherein

R is a member selected from the group consisting of hydrogen, lower alkyl, and lower alkanoyl;

$R^1$ is alkyl of from 1 to 10 carbons;

$R^2$ and $R^3$ each are members selected from the group consisting of hydrogen and lower alkyl; and $R^5$ is lower acyclic hydrocarbyl free from aromatic unsaturation.

16. A compound as claimed in claim 15 wherein R is hydrogen.

17. A compound as claimed in claim 16 wherein said $R^2$ and $R^3$ are both hydrogen.

18. A compound as claimed in claim 16 wherein one of said $R^2$ and $R^3$ is hydrogen and the other is alkyl.

19. A compound as claimed in claim 16 wherein said $R^2$ and $R^3$ are both alkyl.

20. A compound as claimed in claim 19 wherein said $R^2$ and $R^3$ are both methyl.

21. A compound as claimed in claim 20 wherein said $R^1$ is pentyl and said $R^5$ is methyl.

22. A compound as claimed in claim 20 wherein said $R^1$ is pentyl and said $R^5$ is ethynyl.

23. A 6a,10a-trans compound as represented by the formula:

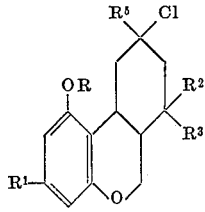

wherein

R is a member selected from the group consisting of hydrogen, lower alkyl, and lower alkanoyl;

$R^1$ is alkyl of from 1 to 10 carbons;

$R^2$ and $R^3$ each are members selected from the group consisting of hydrogen and lower alkyl; and $R^5$ is lower acyclic hydrocarbyl free from aromatic unsaturation.

24. A compound as claimed in claim 23 wherein R is hydrogen.

25. A compound as claimed in claim 24 wherein said $R^2$ and $R^3$ are both hydrogen.

26. A compound as claimed in claim 24 wherein one of said $R^2$ and $R^3$ is hydrogen and the other is alkyl.

27. A compound as claimed in claim 24 wherein said $R^2$ and $R^3$ are both alkyl.

28. A compound as claimed in claim 27 wherein said $R^2$ and $R^3$ are both methyl.

29. A compound as claimed in claim 28 wherein said $R^1$ is pentyl and said $R^5$ is methyl.

References Cited

UNITED STATES PATENTS

| | | | |
|---|---|---|---|
| 2,419,934 | 5/1947 | Adams | 260—345.3 |
| 2,419,935 | 5/1947 | Adams | 260—345.3 |
| 2,509,386 | 5/1950 | Adams | 260—345.3 |
| 2,419,936 | 5/1947 | Adams | 260—345.3 |

OTHER REFERENCES

Taylor et al., Jour. Amer. Chem. Soc., vol. 88, pp. 367–9 (1966).

Eliel, "Steriochemistry of Carbon Compounds," McGraw-Hill, New York (1962), pp. 31–41.

NORMA S. MILESTONE, Primary Examiner

J. M. FORD, Assistant Examiner

U.S. Cl. X.R.

260—343.2, 345.2, 999

PO-1050
(5/69)

UNITED STATES PATENT OFFICE
CERTIFICATE OF CORRECTION

Patent No. 3,507,885         Dated April 21, 1970

Inventor(s)   Fahrenholtz

It is certified that error appears in the above-identified patent and that said Letters Patent are hereby corrected as shown below:

Column 18, line 75 in claim 15

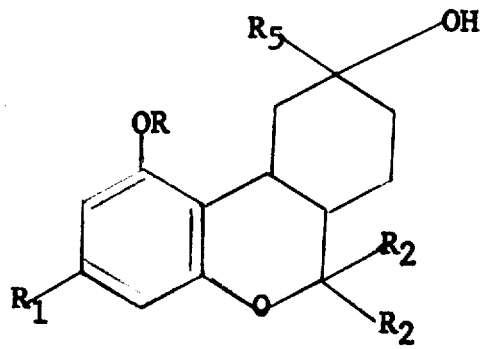 should be 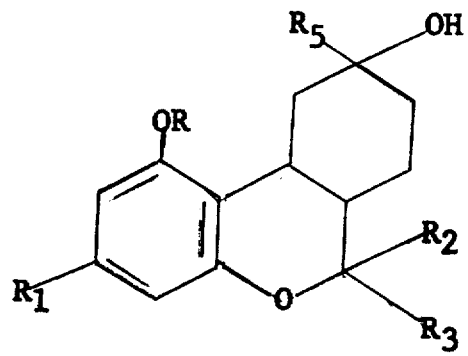

Column 19, line 30 in claim 23

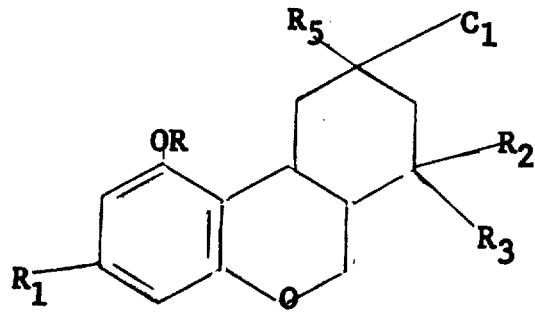 should be 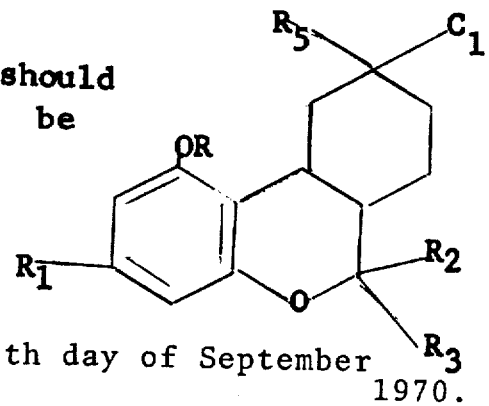

Signed and sealed this 15th day of September 1970.

(SEAL)
Attest:

EDWARD M. FLETCHER, JR.
Attesting Officer

WILLIAM E. SCHUYLER, JR.
Commissioner of Patents